United States Patent
Lo et al.

(10) Patent No.: US 7,724,739 B2
(45) Date of Patent: May 25, 2010

(54) SOURCE SPECIFIC MULTICAST LAYER 2 NETWORKING DEVICE AND METHOD

(75) Inventors: Tsia Yiu Lo, San Jose, CA (US); Jie Cheng Jiang, Foster City, CA (US); Senthil Arunachalam, Fremont, CA (US); Sundher Narayanaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 938 days.

(21) Appl. No.: 11/083,809

(22) Filed: Mar. 18, 2005

(65) Prior Publication Data

US 2006/0209829 A1 Sep. 21, 2006

(51) Int. Cl.
*H04L 12/28* (2006.01)
*H04L 12/56* (2006.01)

(52) U.S. Cl. .................. 370/390; 370/392; 370/432; 709/231

(58) Field of Classification Search ........... 370/389, 370/392; 709/238
See application file for complete search history.

(56) References Cited

U.S. PATENT DOCUMENTS

| | | | | |
|---|---|---|---|---|
| 6,349,340 B1 * | 2/2002 | Dyer et al. | ............... | 709/231 |
| 6,418,480 B1 * | 7/2002 | Rijhsinghani | ............... | 709/245 |
| 6,977,891 B1 * | 12/2005 | Ranjan et al. | ............... | 370/229 |
| 7,027,406 B1 * | 4/2006 | Shabtay et al. | ............... | 370/252 |
| 7,054,304 B2 | 5/2006 | Wang | ............... | 370/352 |
| 2002/0087730 A1 * | 7/2002 | Yonekura | ............... | 709/247 |
| 2002/0154639 A1 * | 10/2002 | Calvert et al. | ............... | 370/400 |
| 2003/0185209 A1 * | 10/2003 | Lee | ............... | 370/390 |
| 2003/0223402 A1 * | 12/2003 | Sanchez et al. | ............... | 370/351 |
| 2004/0076154 A1 * | 4/2004 | Mizutani et al. | ............... | 370/389 |
| 2004/0100983 A1 * | 5/2004 | Suzuki | ............... | 370/432 |
| 2004/0122890 A1 * | 6/2004 | Watkinson | ............... | 709/203 |
| 2005/0036445 A1 * | 2/2005 | Chien-Hsin | ............... | 370/229 |
| 2005/0041680 A1 * | 2/2005 | Tanaka et al. | ............... | 370/432 |
| 2005/0117576 A1 * | 6/2005 | McDysan et al. | ............... | 370/389 |
| 2005/0157741 A1 * | 7/2005 | Wu et al. | ............... | 370/432 |

OTHER PUBLICATIONS www.dell.com, "Understanding IGMP Snooping," 4 pages total, Feb. 2004, Dell Inc., www.dell.com/downloads/global/products/pwcnt/en/app_note_18.pdf.

* cited by examiner

*Primary Examiner*—Gregory B Sefcheck
*Assistant Examiner*—Salvador E Rivas
(74) *Attorney, Agent, or Firm*—Stolowitz Ford Cowger LLP

(57) ABSTRACT

Bridge domain communication methods and devices are presented for efficiently communicating information in a bridge domain based upon group indications and source indications. Packets with a source and destination indication are received. A bridge domain communication process is performed at the bridge level wherein a packet is selected for forwarding based upon a source and group indication. For example, a determination is made if a particular bridge domain corresponds to the group destination indication in the received packet. The source indication in the packet is compared with a tracked source designation indication. Output ports associated with the tracked source designation indication are identified if the tracked source designation indication matches the received source indication. The communication packet is forwarded on identified ports.

15 Claims, 6 Drawing Sheets

300

310

Determining if a group destination indication in a received packet corresponds to a host communicatively coupled to a particular bridge domain and the host has indicated it is to be included in the distribution of information associated with the group.

320

Comparing a source indication in a received packet with a tracked source indication designation.

330

Identifying output ports associated with the tracked source indication designation.

```
410
┌─────────────────────────────────────────────────────────────┐
│   Performing a layer 2 selective bridge configuration process. │
└─────────────────────────────────────────────────────────────┘
                              │
                              ▼
                                                          420
┌─────────────────────────────────────────────────────────────┐
│   Performing destination and source based layer 2 bridge switching. │
└─────────────────────────────────────────────────────────────┘
```

510
Adding a port to an include source member port list if an IGMPv3 host member indication is received from the port with the include filter mode indication asserted to indicate the source (S, G) is identified as being included.

520
Adding a port to an exclude source member port list if an IGMPv3 host member indication is received from the port with the exclude filter mode indication asserted to indicate the source (S, G) is identified as being excluded.

530
Removing a port from the include source member port list if there no are v3 host member indications received from the port with an include filter mode indication asserted to indicate the source (S, G) is identified as being included.

540
Removing a port from the exclude source member port list if there are no v3 host member indications from the port with an exclude filter mode indication asserted to indicate the source (S, G) is identified as being excluded.

SOURCE SPECIFIC MULTICAST LAYER 2 NETWORKING DEVICE AND METHOD

FIELD OF THE INVENTION

This invention relates to the field of network communications. In particular, the present invention relates to a source specific multicast layer 2 networking device and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reductions in analyzing and communicating data, ideas and trends in most areas of business, science, education and entertainment. These results are often achieved utilizing distributed network resources. However, managing the communication to distributed networked resources can be complicated and a number of conditions can adversely impact the timing of various operations. For example, there are usually numerous different users on a network that often have selective desires for various information. Inefficient distribution of the information can have detrimental impacts on the overall performance of a network and end use applications.

Communication networks are usually configured in a hierarchical architecture including multiple layers. For example, the Internet typically includes a first layer, second layer and third layer of hierarchical communication devices. The first layer typically includes end use devices which users utilize to access a network. The second layer devices (e.g., layer 2 switches) are typically utilized to control and manage communications within a subnet (e.g., a local area network). The third layer devices (e.g., layer 3 routers) are typically utilized to route communications between subnets. The speed at which information is communicated and processed usually has a significant impact on the end use applications. Numerous end use applications such as real time applications (e.g., video broadcasts, voice over internet protocol, streaming audio, etc.) are adversely affected if information is not delivered in a timely manner.

The Internet is becoming a very diverse and prevalent communication network. Transmission Control Protocol/Internet Protocol (TCP/IP) are typically utilized for Internet communication and offer a number of advantages. For example, various IP multicast architectures (e.g., mbone) enable users to easily join multicast groups and the Internet Group Management Protocol (IGMP) is defined in RFC 1112 as the standard for IP multicasting on the Internet. The IGMP can be utilized by a host to easily establish host memberships in particular multicast groups by informing layer 3 devices (e.g., a router) that the host wants to receive messages addressed to a specific multicast group.

Multicast communications are typically utilized to communicate information over a network to groups of hosts or end users. For example, e-mail mailing lists, media communications (e.g., television), teleconferencing, videoconferencing, etc. often use multicast communications. Multicast technologies used to communicate data are often associated with narrowcast business models and typically send information to a select group rather than every client connected to a network (e.g., in network wide broadcast communications). Multicast is advantageous for communicating large amounts of information because the information can be forwarded to multiple end users simultaneously, rather than other communication mechanisms that use separate connections for each destination and source pair. One set of packets is transmitted to the destinations in a group. However, sending large amounts of information to every member in a group can cause significant bottlenecks and delays in network architecture components by consuming or occupying significant bandwidth of the components.

DESCRIPTION OF THE DRAWINGS

FIG. 3 is a flowchart of an exemplary bridge domain port selection process in accordance with one embodiment of the present invention.

FIG. 4 is a flow chart of an exemplary layer 2 selective bridge communication method in accordance with one embodiment of the present invention.

FIG. 5 is a flow chart of an exemplary port member list process in accordance with one embodiment of the present invention.

DETAILED DESCRIPTION

Figure 1:
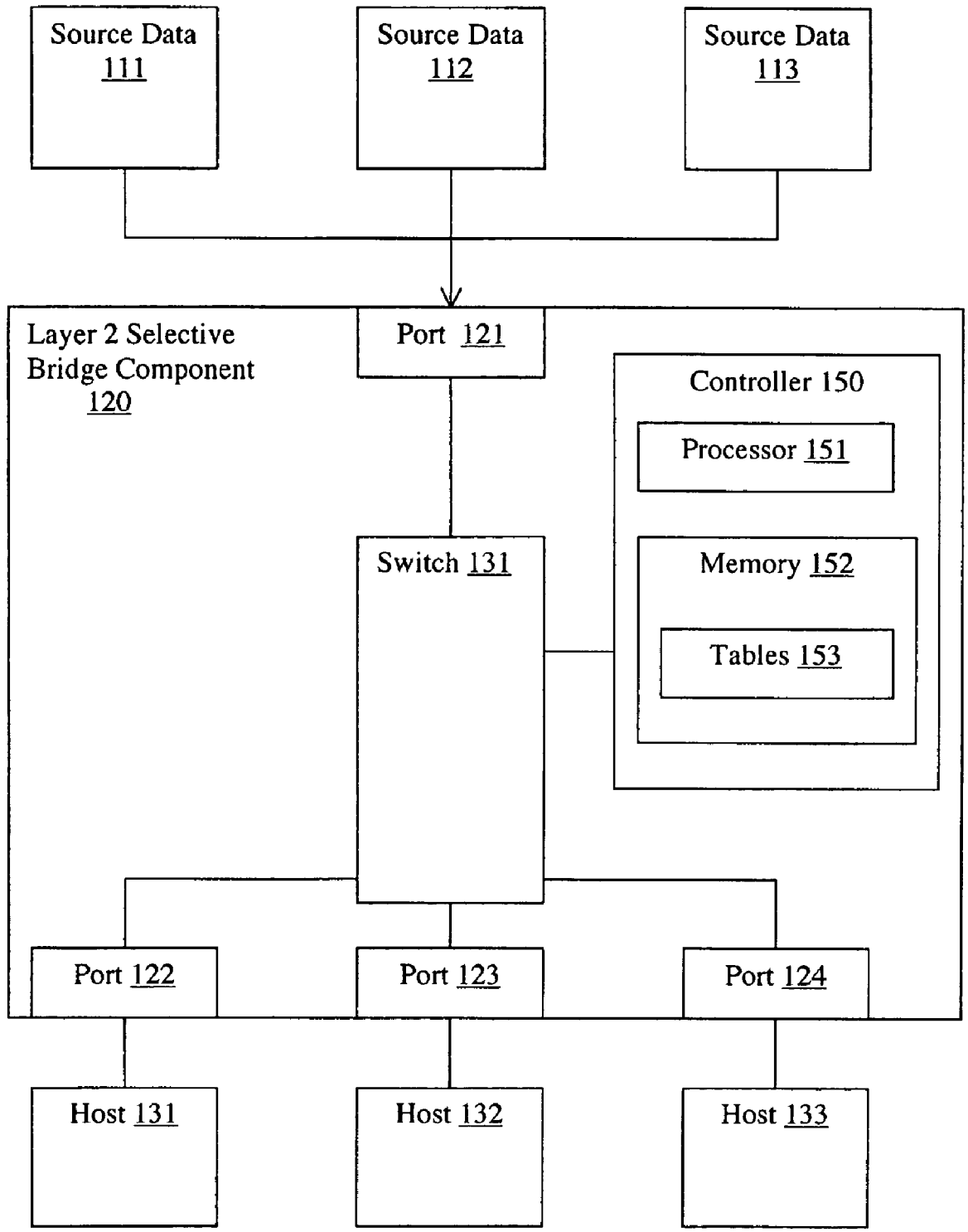
FIG. 1 is a block diagram of a communication system including an exemplary layer 2 selective bridge communication device in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention facilitates efficient communication of information in a layer 2 bridge domain. Present invention embodiments forward information in the layer 2 bridge domain based upon tracked group and source indications. Multiple end use hosts subscribing to the same destination IP group can receive IP multicast traffic from sources the end use hosts wish to receive the information from without receiving information from other sources sending data to the same destination group. In one exemplary implementation, a first end use host H1 and a second end use host H2 subscribe to the same group G, but different sources (e.g., S1 and S2 respectively) but indicate the hosts want to receive inform from different sources sending data to the same destination group G. Embodiments of the present invention can control information flow so that information from S1 is forwarded to H1 without information from S2 and information from S2 is forwarded to H2 without information from S1. Selectively forwarding the information based upon group and source indications can minimize congestion of information being forwarded to hosts not interested in the information.

FIG. 1 is a block diagram of communication system 100 including a present invention layer 2 selective bridge communication device 120 in accordance with one embodiment of the present invention. Communication system 100 includes source data 111, 112 and 113, layer 2 selective bridge device 120 and hosts 131, 132 and 133. Sources 111, 112 and 113 are communicatively coupled to layer 2 selective bridge device 120, which in turn is communicatively coupled to hosts 131, 132 and 133.

The components of communication system 100 cooperatively operate to provide selective bridge forwarding of communication packets. Source data 111, 112 and 113 are forwarded to layer 2 selective bridge 120 from one or more sources (not shown). For example, source data 111 and 112 (e.g. data related to ESPN and HBO programs) can come from a first content supplier (e.g., a cable network) and source data 113 (e.g., e-mail) can be from a second different content supplier (e.g., mailing group). In one exemplary implementation, source data 111, 112 and 113 have the same group indication (e.g., group destination address). In the present example, source data 111 and 112 have the same source address (e.g., IP source address) associated with the first content supplier and source data 113 has a different source address associated with the second content supplier. In one embodiment, the first content supplier can forward source data 111 and source data 112 from different source addresses. Layer 2 selective bridge 120 selectively forwards the source data 111, 112 and 113 information to the hosts based upon group destination information (e.g., IP group destination address) and source information (e.g., IP group source address) in the source data. Hosts 131, 132 and 133 provide layer 2 selective bridge 120 with an indication of the source data 111, 112 and/or 113 the respective hosts 131, 132 and 133 wish to receive. Hosts 131, 132 and 133 can be end use hosts that utilize the source data in various applications (e.g., a streaming video display, an e-mail application, etc.).

Layer 2 selective bridge device 120 includes input port 121, switch 131, controller component 150, and output ports 122, 123, and 124. Input port 121 is coupled to switch 131, which in turn is coupled to output ports 122, 123, and 124. Switch 131 is also coupled to controller 150. Input port 121 receives communication packets. Switch 131 selectively forwards the communication packets to the output ports. Output ports 122, 123 and 124 forward the communication packet to hosts 131, 132 and 133 respectively. Controller component 150 controls selection of information (e.g., the communication packets) switched to each of the output ports based upon source and group destination indications within the communication packets. In one exemplary implementation, the group destination information included in source data 111, 112 and 113 is the same (e.g., a destination address for layer 2 selective bridge 120) and controller component 150 forwards the information based upon the source indication.

In one embodiment of the present invention, controller component 150 includes processor 151 and memory 152. Processor 151 is coupled to memory 152. Processor 151 selectively identifies which of the plurality of output ports a communication packet is to be communicated on. Memory 152 stores instructions for the processor including instructions for selective layer 2 switching based upon source and group destination indications. In one exemplary implementation, memory 152 includes hardware table 153 for mapping ports to group destination indications and source indications. Controller component 150 selects which output ports (e.g., 122, 123 and/or 124) to forward information on in accordance with table 153 mapping of the output ports to combinations of group destination indications and source indications. Controller component 150 opens up a received packet and analyzes source and group destination indications included in the packet. Based on the analysis, controller component 150 forwards packets to output ports mapped to the corresponding group destination and source indication. In one embodiment, packets are forwarded to an output port unless controller component 150 prevents or blocks a packet from being forwarded to the output port (e.g., the port is not mapped to a corresponding group destination and source indication).

FIG. 4 is a flow chart of exemplary layer 2 selective bridge communication method 400 in accordance with one embodiment of the present invention. Layer 2 selective bridge communication method 400 facilitates efficient communication of information through a layer 2 bridge device. In one exemplary implementation, layer 2 selective bridge communication method 400 blocks group destination source data from ports that service hosts which have indicated the hosts do not want to receive group destination information from particular sources.

In step 410, a layer 2 selective bridge configuration process is performed. In one embodiment, a layer 2 bridge device is configured to perform destination group and source selective switch forwarding. For example, a layer 2 bridge is configured to forward group destination data from particular sources to particular output ports based upon configuration information (e.g., include and exclude indications received from hosts).

In step 420, group destination and source based bridging is performed. In one embodiment of the present invention, the group destination and source based bridging is performed in layer 2 (e.g. by a layer 2 communication bridge device). In one exemplary implementation, the group destination and source based bridging includes a bridge domain communication process.

Figure 2:
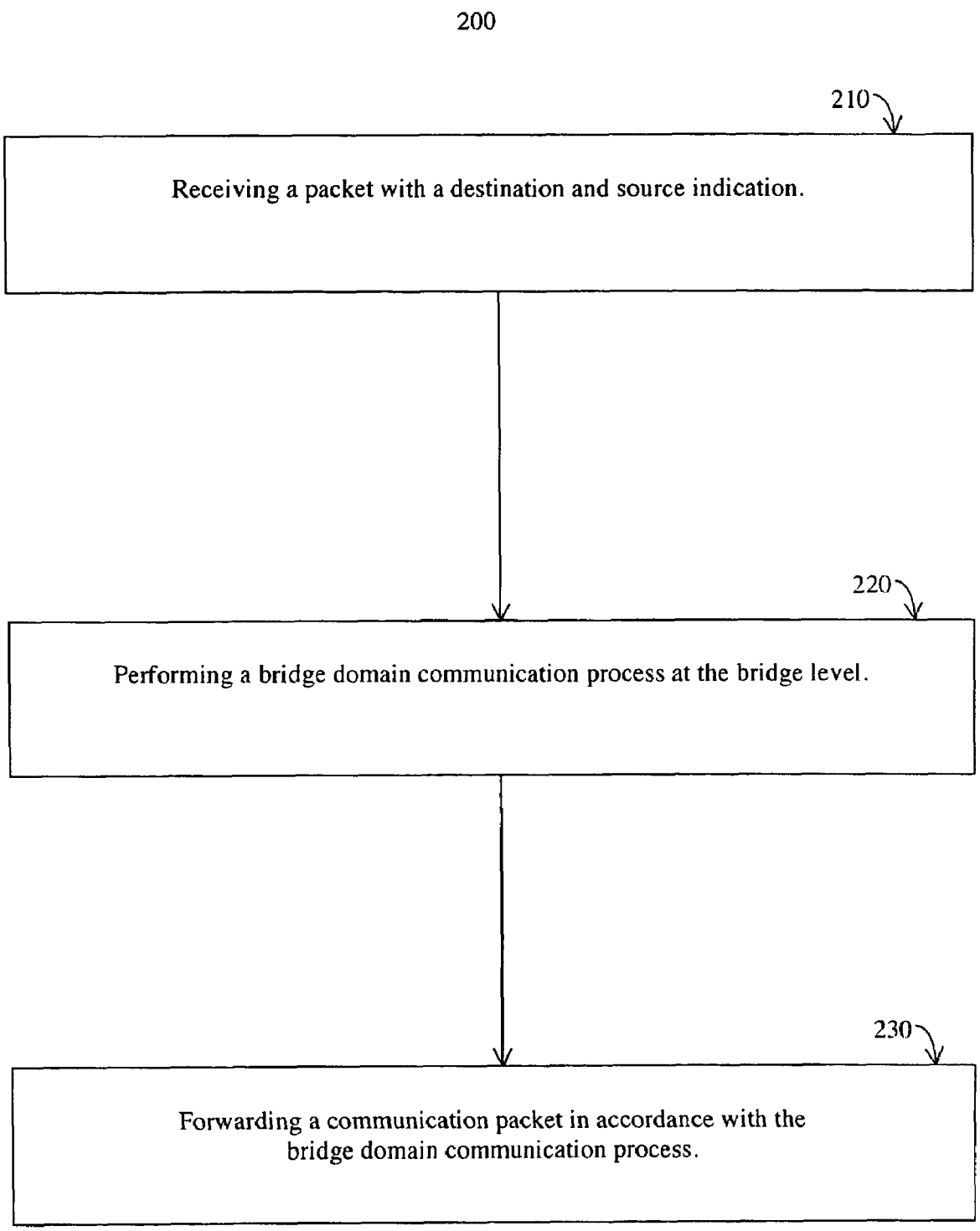
FIG. 2 is a flow chart of an exemplary bridge domain communication method in accordance with one embodiment of the present invention.

FIG. 2 is a flow chart of bridge domain communication method 200 in accordance with one embodiment of the present invention. In one embodiment of the present invention, bridge domain communication method 200 facilitates efficient communication of information in a layer 2 device. For example, bridge domain communication method 200 can be utilized to prevent communication of extraneous or unwanted information to hosts communicatively coupled (e.g., wired, wirelessly, optically, etc.) to a layer 2 bridge device.

In step 210, a packet is received with a source and group destination indication. In one embodiment, the source and group destination indications are Internet Protocol (IP) addresses. Packets can be received from a single source or from a variety of different sources.

In step 220, a bridge domain port selection process is performed at the bridge level in which source and group based forwarding is executed. A bridge domain port selection process identifies ports for forwarding received packets. In one exemplary implementation, an output port is identified or selected for forwarding the packet downstream based upon an association between the source and group destination indication included in the received packet and tracked source and group information.

In step 230, the packet is forwarded in accordance with the bridge domain port selection process (e.g., to ports identified in the bridge domain port selection process). For example, when a received packet has the appropriate group destination indication and source indication mapped in a hardware registration table to a port (e.g., associated with a host wanting to receive information via the port), the switch forwards the packet to the port. In one embodiment, information in communication packets associated with the group destination is blocked from being forwarded to ports not associated with a desired source indication.

FIG. 3 is a flowchart of exemplary bridge domain port selection process 300 in accordance with one embodiment of the present invention. In one embodiment of the present invention, bridge domain port selection process 300 is utilized in step 220 of bridge domain communication method 200 to identify ports for forwarding information (e.g., multicast information).

In step 310, a determination is made if a group destination indication in a received packet corresponds to a host communicatively coupled to a particular bridge domain and the host has indicated it is to be included in the distribution of information associated with the group. If a bridge domain is not communicatively coupled to a host that has indicated the host is to be included in the distribution of information associated with the group, the packet is dropped. If a particular bridge domain is communicatively coupled to a host which has indicated it is to be included in the distribution of information associated with the group, the process proceeds to step 320.

In step 320, a source indication in a received packet is compared with a tracked source indication designation. In one exemplary implementation, the tracked source indication designation is received from a host device. If the source indication included in a received packet does not match a tracked source indication designating the packet should be forwarded to a downstream host, the packet is dropped. In one embodiment, the tracked source indication designates packets received with a particular source indication are to be blocked from downstream communication to the host and the packets are dropped. If the received source indication does match a tracked source indication designating packets received with a particular source indication are to be forwarded downstream, the process proceeds to step 330.

In step 330, output ports associated with the tracked source indication are identified. In one exemplary implementation, hardware registration tables are utilized to identify desired source indications. For example, a host registers on a particular port of a switch and the switch maps the port to the host in a hardware registration table along with the desired source indication provided by the host.

In one embodiment of the present invention, group designation and source based forwarding in Layer 2 bridging network for IGMP v3 is performed. The hosts and ports can be in the same VLAN. For example, a present invention Layer 2 selective bridge device is capable of performing Layer 2 Virtual LAN (VLAN) group destination and source based forwarding in a manner that is compatible with IGMP v3. Data structures utilized in the present invention can also be compatible with data structures guidelines for tracking sources described the RFC 3376. Explicit tracking of associations between subscribing hosts and the physical ports can be included. The tracking can utilize any data structures that include information on correspondence of hosts, physical ports, modes (e.g., include/exclude) and source information.

In one embodiment, the new data structure for performing IGMP v3 (S, G) forwarding are two port to source information fields added to an IGMP v3 compliant multicast IP source type data structure (e.g., mcast_ipsrctype). The first port to source information field is an exclude port member field (e.g., called exc_src_to_port_bitlist) from the IGMP v3 group. The second port to source information field is an include port member field (e.g., called inc_src_to_port_bitlist) in IGMP v3 group. These fields correspond to the include source member port list and exclude source member port list and are utilized to track the appropriate forwarding ports for information packets associated with sources identified in the fields.

In one embodiment, another field (e.g., called src_removed) is also included for identifying and holding deleted or removed sources. This field can also have the same data structure as a source list (e.g., v3_src_list) in a multicast information type data structure (e.g. mcast_v3infotype). In one exemplary implementation, this field can be utilized to "hold" the deleted sources with type mcast_ipsrctype if either inc_src_to_port_bitlist or exc_src_to_port_bitlist is not zero. The not zero indication indicates there exist some hosts communicatively couple to some ports interested in the identified source for either exclude or include consideration. For example, if a source identification is being removed and there exists a host (e.g., a host tracked by EHT) interested in the source for designation in an include or exclude mode (e.g., as identified in the inc_hosts and exc_hosts fields of mcast_ipsrctype), then the source identification is also moved to the source removed indication field (e.g., src_removed). The included host indications and excluded host indications (e.g., inc_hosts and exc_hosts) are maintained (e.g., by EHT) to track the number of hosts interested in the identified source for include or exclude consideration respectively.

In one embodiment, the present invention facilitates coordinated removal of source indications. For example, in implementations utilizing a data structure compatible with an IGMP data structure (e.g., mcast_ipsrctype) a source can be removed (e.g., by a report), but there could still be hosts interested in the source. In this case, hardware telecommunication access method (TCAM) entry forwarding lists can be stored in the memory for later updating to TCAM. A field similar to the v3_src_list data structure can be used for ease of maintenance. In another exemplary implementation, a flag inside a mcast_ipsrctype field can be added as a removal semantic. In one exemplary flag implementation, the field is checked to determine if a source is "virtually" deleted.

FIG. 5 is a flow chart of port member list process 500 in accordance with one embodiment of the present invention. Port member list process 500 can be utilized to update an include source member port list and exclude source member port list. The steps of port member list process 500 are performed for each source and group (S, G) combination where S is a source indication and G is a multicast group indication. In one embodiment, include source member port and exclude source member port information are maintained for each (S, G).

In step 510, a port is added to the include source member port list if there exists an IGMP v3 host member report received from the port with the include filter mode indication asserted to indicate the source and group (S, G) are identified as being included. In one exemplary implementation, the port member bit in inc_src_to_port_bitlist is set if there exists a v3 host member report received from the port with an include filter mode indication which includes the source indication and group indication (S, G) in the v3 host member report.

In step 520, a port is added to the exclude source member port list if there exists a v3 host member report received from the port with the exclude filter mode indication asserted to indicate the source and group (S, G) are identified as being excluded. In one exemplary implementation, the port member bit in exc_src_to_port_bitlist is set if there exists a v3 host member report received from the port with an exclude filter mode indication which includes the source indication and group indication (S, G) in the v3 host member report.

In step 530, a port is removed from the include source member port list if there is no longer any v3 host member report received from the port with the include filter mode indication asserted to indicate the source and group (S, G) are identified as being included. In one exemplary implementation, the port member bit in inc_src_to_port_bitlist is reset if there is no longer any v3 host member report received from the port with an include filter mode indication which includes the source indication and group indication (S, G) in the v3 host member report. In one embodiment of the present invention, a port is removed from the include source member port list if an indication to remove the port is received.

In step 540, a port is removed from the exclude source member port list if there is no longer any v3 host member report received from the port with the exclude filter mode indication asserted to indicate the source and group (S, G) are identified as being excluded. In one exemplary implementation, the port member bit in ex_src_to_port_bitlist is reset if there is a v3 host member report received from the port with an exclude filter mode indication which includes the source indication and group indication (S, G) in the v3 host member report. In one embodiment of the present invention, a port is removed from the exclude source member port list if an indication to remove the port is received.

The source and group (S, G) information can be retained for as long as there is a host interested in the information. The interest can either be with regards to inclusion or exclusion.

Figure 6:
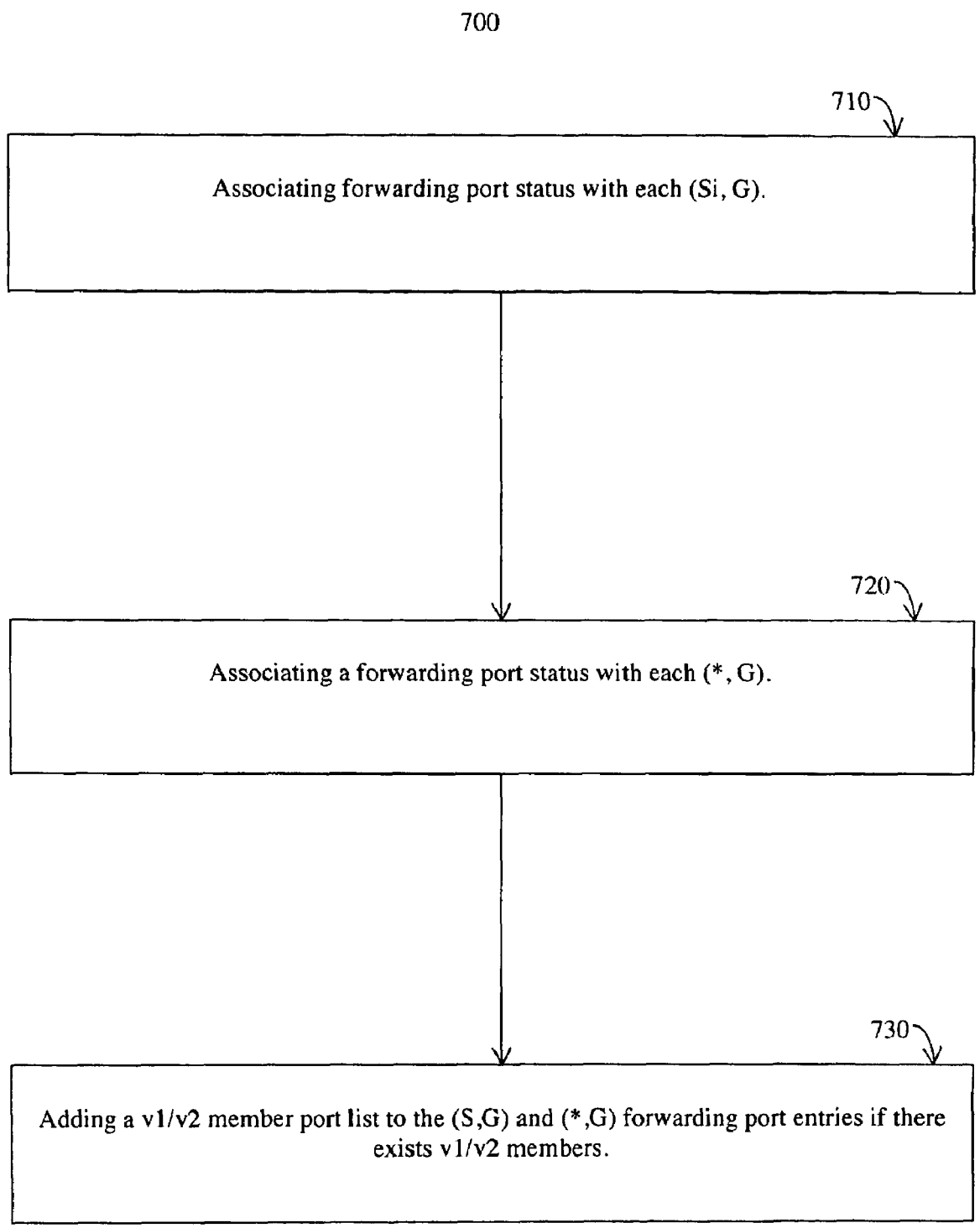
FIG. 6 is a flow chart of an exemplary port information update population process in accordance with one embodiment of the present invention.

FIG. 6 is a flow chart of port information update population process 700 in accordance with one embodiment of the present invention. Port information update population process 700 is executed in accordance with guidelines for updating port information for each source indication and group indication combination (S, G). In one embodiment, port information update population process 700 is applied whenever a change of state occurs (e.g., a host indicates a desire to receive and/or not to receive multicast data from a source).

In step 710, a forwarding port status is associated with each (Si, G) combination. In one embodiment, for each (Si, G) combination entry in a TCAM table a forwarding port status is associated with ports from a corresponding include source member port list. The entry in a TCAM table forwarding port information also includes information from other (Sj (j !=1) G) exclude source member port lists provided:
  the port member in an exclude source member port list of (Sj, G) does not exist in exclude source member port list of (Si, G), or,
  the port exists in an exclude source member port list of both (Sj, G) and (Si, G), for each (Sj, G, Hx) combination where Hx are the hosts that are in the exclude mode for (Sj, G) for all x on this port and (Si, G, Hy) where Hy are the hosts that are in the exclude mode for (Si, G) for all y on the same port such that there exists a host of x (Hx) that is not in host of y (Hy).

In step 720, a forwarding port status is associated with each (*, G). In one embodiment, for each (*, G) entry in a TCAM table a forwarding port status is associated with ports from all (S, G)s' exclude source member port list. In one exemplary implementation of step 720, the (*, G) uses a logical "OR" of all exclude list from all (S, G). This computed value can be first stored in v3_group_port_bitlist and then updated to the hardware. Whenever an IGMP v3 events occurs (e.g., receipt of a report), the newly computed value is compared to the stored v3_group_port_bitlist and updated to the hardware if the values differ.

In step 730, a v1/v2 member port list can be added to the (S, G) and (*, G) forwarding port entries, if there exists v1/v2 members. In one embodiment, the present invention is implemented in a system with IGMP v1/v2 members and the hardware forwarding port list in the (S, G) and (*, G) include the information from steps 710 and 730, as well as information associated with the v2 member ports. When a v1/v2 member leaves resulting in no more v1/v2 members associated with a port and there exists some v3 members associated with that port, the hardware's forwarding port list in (S, G) and (*, G) is updated according to steps 710 and 720 if there exists any leaving v1/v2 member port in the inc_src_to_port bitlist or exc_src_to_port_bitlist. The v1/v2 member port is not simply removed from (S, G) and (*, G) as the reverse presence of a v1/v2 member. For example, there could be an intersection of v1/v2 member port and v3 member ports. By removing v1/v2 member ports solely without the above processing, some v3 member ports may be accidentally removed.

In one exemplary implementation, the basic port information update population process 700 is applied and the forwarding port list information for the TCAM entries is updated whenever a new v3 report is received. In another exemplary implementation, selective updates to the (S,G) entries are performed in which some of the (S, G) entries are updated. Sometimes, no update to the forwarding ports is needed. Embodiments of the present invention can include optimizations to port tracking processes.

In one embodiment, optimization of port information update population process 700 is performed. For example, updating the TCAM (S, G) and (*, G) entries can be optimized. When a new v3 report is received that results in creation of a new group, the (S, G) and (*, G) entries can first be created according to the received report and 3 basic steps described above. When a v1/v2 member joins an existing v3 group, basic step 730 described above can be applied. When a v1/v2 member port leaves, if there exists some v3 members, the leaving port can simply be removed from all (S, G) and (*, G) if the leaving port does not exist in both the inc_src_to_port_bitlist and exc_src_to_port_bitlist of any (S, G). Otherwise, all of the (S, G) and (*, G) are updated according to the 3 basic process steps 710, 720 and 730. If there is an addition of a member port to the inc_src_to_port_bitlist and no change to the exc_src_to_port_bitlist occurs for a (S, G), the new port member is added to the TCAM forwarding port entry for the (S, G). If there is a removal of a member port to inc_src_to_port_bitlist and no change to the exc_src_to_port_bitlist occurs for a (S, G), the member port can be removed from a TCAM forwarding port entry for the (S, G) if the leaving port does not violate the conditions set forth in step 710. If there is an addition of a member port to exc_src_to_port_bitlist and no change to the inc_src_to_port_bitlist occurs for a (S, G), the port is added to other (S, G)s' TCAM forwarding entries if they satisfy the conditions set forth in step 710.

Other exemplary optimizations can also be made to the basic port information update population process 700. For example, whenever removal of a member port to exc_src_to_port bitlist occurs, all the (S, G) and (*, G) are updated according to the 3 basic steps all over again. For the (S, G) where the addition of a member port to exc_src_to port bitlist occurs, step 710 is reapplied again to update the forwarding port list for this TCAM entry. Adding this port to the (*, G) TCAM entry is performed irregardless. If a change to both a inc_src_to_port bitlist and an exc_src_to_port_bitlist occurs simultaneously, all the (S, G) and (*,G) are updated according to the 3 basic steps all over again. When inc_sr_to_port_bitlist and exe_src_to_port_bitlist become zero, the (S, G), (*, G) are removed only if there is no v1/v2/v3 member.

The following examples are presented to provide an exemplary understanding of the present invention. While the following examples are set forth with numerous specific details, the present invention is not limited to the flowing implementations.

In one embodiment of the present invention, a remark is received at a first time T1 and a second remark is received at time T2. In one exemplary implementation, T2 is after T1. In a first example, T1 includes an is_inc(s1) indication received from a first port p1 and T2 includes an is_inc(s1) indication received from a second port p2. The source to port member port lists are:

| Source S1 | Fwd Ports |
|---|---|
| Inc_src_to_port_bitlist<br>Exc_src_to_port_bitlist | P1, P2 |

The TCAM has the following entries:

| Group | Source | Fwd ports | Remark |
|---|---|---|---|
| G1 | S1 | P1, P2 | Basic step 710 condition a. |
| G1 | * | drop | Basic step 720 |

In a subsequent exemplary report T1 includes an is_exc(s1) indication received from port p1 and T2 includes an is_exc(s1) indication received from port p2. The source to port member port lists are modifies as follows:

| Source S1 | |
|---|---|
| Inc_src_to_port_bitlist<br>exc_src_to_port_bitlist | P1, P2 |

The TCAM has the following entries:

| Group | Source | Fwd ports | Remark |
|---|---|---|---|
| G1 | S1 | drop | Basic step 710 |
| G1 | * | P1, P2 | Basic step 720 |

In another subsequent report T1 includes an is_inc(s1) indication received from port p1 from host h1 and T2 includes an is_exc(s1) indication received from port p1 from host h1.

| Source S1 | |
|---|---|
| Inc_src_to_port_bitlist<br>Exc_src_to_port_bitlist | P1 |

When is_exc(s1) is received from p1 and h1, the EHT will decrement the inc_hosts count as this report is from the same host as the previous one. This event will trigger the update to inc_src_to_port_bitlist and result in p1 being removed from inc_src_to_port_bitlist. The TCAM has the following entries:

| Group | Source | Fwd ports | Remark |
|---|---|---|---|
| G1 | S1 | Drop | Basic step 710 condition a and b. |
| G1 | * | P1 | 720 |

In another exemplary report T1 includes an is_inc(s1) indication received from port p1 from host h1 and T2 includes an is_exc(s1) indication received from port p1 from host h2.

| Source S1 | |
|---|---|
| Inc_src_to_port_bitlist | P1 |
| Exc_src_to_port_bitlist | P1 |

The TCAM will have the following entries:

| Group | Source | Fwd ports | Remark |
|---|---|---|---|
| G1 | S1 | P1 | Basic step 710 condition a. |
| G1 | * | P1 | 720 |

Although the previous examples only included a first group G1 it is appreciated that the present invention is readily adaptable to a plurality of group designations.

Thus, the present invention is a system and method that facilitates efficient communication of information at the layer 2 bridge level. For example, in a single broadcast VLAN domain, end hosts which are IGMP v3 compliant are not congested with IP multicast traffic uninterested in IP multicast sources sending data to the same destination group.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   receiving, at a network processing device, a multicast packet from a content supplier over a network, where the multicast packet includes a source address identifying the content supplier of the multicast packet and includes a multicast group address identifying a multicast group associated with the multicast packet;
   identifying, with the network processing device, one or more recipient devices subscribed to the multicast group identified by the multicast group address;
   receiving, at the network processing device, a multicast group indicator from at least one recipient device subscribed to the multicast group, the multicast group indicator to identify one or more content suppliers for the multicast group and to indicate the at least one recipient device does not wish to receive multicast traffic from the identified content suppliers;
   comparing, with the network processing device, the source address in the multicast packet with the multicast group indicator to determine whether the recipient device associated with the multicast group is to receive the multicast packet from the content supplier identified in the source address;
   forwarding, with the network processing device, the multicast packet to at least one output port associated with the recipient device when the multicast group indicator indicates the recipient device wishes to receive multicast traffic from the content supplier of the multicast packet; and
   blocking, with the network processing device, the multicast packet from the at least one output port associated with the recipient device when the multicast group indicator indicates the recipient device does not wish to receive multicast traffic from the content supplier of the multicast packet.

2. A method of claim 1 wherein the multicast group address and the source address are received from a single content supplier.

3. A method of claim 1 wherein the multicast group address and the source address are Internet Protocol (IP) addresses.

4. A method of claim 1 wherein the multicast packet is received by a layer 2 switching device, the multicast group address in the multicast packet identifies the layer 2 switching device, where the layer 2 switching device forwards the multicast packet to one or more recipient devices based on the content supplier of the multicast packet identified by the source address.

5. A device comprising:
   an input port to receive communication packets from a content supplier over a network, where the communication packets include a source address identifying the content supplier and includes a multicast group address identifying a multicast group associated with the communication packets, where the input port is configured to receive a request from at least one recipient device subscribed to the multicast group, the request to identify one or more content suppliers for the multicast group and to indicate the at least one recipient device does not wish to receive multicast traffic from the identified content suppliers;
   a plurality of output ports to forward the communication packets to one or more recipient devices;
   a switch to selectively forward the communication packets to one or more of the output ports; and
   a controller to identify one or more recipient devices associated with the multicast group identified by the multicast group address, and to compare the source addresses in the communication packets with the request to determine whether the recipient device associated with the multicast group is to receive at least one communication packet from the content supplier of the communication packets identified by the source addresses, and wherein the controller is configured to select at least one of the output ports for the switch to forward at least one of the communication packets when the request indicates the recipient device wishes to receive multicast traffic from the content supplier, and to block at least one of the communication packets from at least one output port associated with the recipient device when the request indicates the recipient device does not wish to receive multicast traffic from the content supplier.

6. A device of claim 5 wherein said controller further comprises:
   a processor to selectively identify at least one of the output ports to transmit the communication packet to the corresponding host devices; and
   a memory to store instructions for the processor including instructions for layer 2 switching based upon the multicast group address and source address in the communication packet.

7. A device of claim 6 wherein the memory includes one or more hardware tables to map the communication packets to respective output ports for a multicast presentation to the corresponding host devices, where the mapping of the communications packets is based, at least in part, on an affiliation of the host devices to the multicast group identified by the multicast group address and the content supplier of the multicast packet identified by the source address.

8. A device of claim 7 wherein the controller is configured to access the hardware tables to select one or more of the output ports to transmit the communication packets, where the controller is configured to compare one or more entries in the hardware tables with the multicast group address and the source address to select the output ports for the communication packets.

9. A device of claim 5 wherein the controller is configured to prevent communication packets from being forwarded to any of the output ports corresponding to host devices when communication packets identify a multicast group with the multicast group address that is not associated with the host device or when the communication packets are from the content supplier identified by the source address that is not associated with the host device.

10. A system comprising:
means for receiving a multicast packet from a content supplier over a network, where the multicast packet includes a source address identifying the content supplier and includes a multicast group address identifying a multicast group associated with the multicast packet;
means for in one or more recipient devices subscribed to the multicast group identified by the multicast group address;
means for receiving a request from at least one recipient device subscribed to the multicast group, the request to identify one or more content suppliers for the multicast group and to indicate the at least one recipient device does not wish to receive multicast traffic from the identified content suppliers;
means for comparing the source address in the multicast packet with the request to determine whether the recipient device associated with the multicast group is to receive the multicast packet from the content supplier identified in the source address;
means for forwarding the multicast packet to at least one output port associated with the recipient device when the request indicates the recipient device wishes to receive multicast traffic from the content supplier of the multicast packet; and
means for blocking the multicast packet from the at least one output port associated with the recipient device when the request indicates the recipient device does not wish to receive multicast traffic from the content supplier of the multicast packet.

11. The system of claim 10 further comprising:
means for storing the multicast group indicator;
means for comparing the source address in the multicast packet to the multicast group indicator to identify one or more output ports associated with host devices to receive the multicast packet; and
means for forwarding the multicast packet to the identified output ports.

12. The system of claim 10 wherein the multicast group address and the source address are received from a single content supplier.

13. The system of claim 10 wherein the multicast group address and the source address are Internet Protocol (IP) addresses.

14. The system of claim 10 further comprising:
means for identifying at least one host device that is not associated with the multicast group identified by the multicast group address, or is not to receive multicast packets from the content supplier identified by the source address; and
means for blocking the multicast packet from one or more output ports associated with the identified host device.

15. The system of claim 10 wherein the multicast group address in the multicast packet is configured to identify the means for identifying, where the means for forwarding forwards the multicast packet to one or more host devices based on the content supplier of the multicast packet identified by the source address.

* * * * *

UNITED STATES PATENT AND TRADEMARK OFFICE
CERTIFICATE OF CORRECTION

| | | |
|---|---|---|
| PATENT NO. | : 7,724,739 B2 | Page 1 of 1 |
| APPLICATION NO. | : 11/083809 | |
| DATED | : May 25, 2010 | |
| INVENTOR(S) | : Lo et al. | |

It is certified that error appears in the above-identified patent and that said Letters Patent is hereby corrected as shown below:

Column 13, line 10         In Claim 10, delete "in" and insert -- identifying --, therefor.

Signed and Sealed this
Thirty-first Day of May, 2011

David J. Kappos
*Director of the United States Patent and Trademark Office*